United States Patent [19]

Simuni

[11] Patent Number: 5,176,809
[45] Date of Patent: Jan. 5, 1993

[54] DEVICE FOR PRODUCING AND RECYCLING HYDROGEN

[76] Inventor: Leonid Simuni, 1056 Neilson St. Apt., 6A, Far Rockaway, N.Y. 11691

[21] Appl. No.: 502,234

[22] Filed: Mar. 30, 1990

[51] Int. Cl.⁵ .................. C25B 1/04; C25B 15/08; C25B 9/00; C25B 11/08
[52] U.S. Cl. .................. 204/273; 204/277; 204/278; 204/284; 204/292; 204/129
[58] Field of Search ............ 204/222, 273, 129, 277, 204/278, 292, 284

[56] References Cited

U.S. PATENT DOCUMENTS

| | | | |
|---|---|---|---|
| 826,301 | 7/1906 | Wood | 204/277 X |
| 1,730,997 | 10/1929 | Danckwardt | 204/278 X |
| 2,373,032 | 4/1945 | Klein | 204/278 |
| 3,630,860 | 12/1971 | Fox . | |
| 4,023,545 | 5/1977 | Mosher et al. | 204/129 X |
| 4,233,132 | 11/1980 | Carr | 204/278 X |
| 4,336,122 | 6/1982 | Spirig | 204/222 |
| 4,344,831 | 8/1982 | Weber | 204/277 X |
| 4,361,474 | 11/1982 | Shoaf et al. | 204/278 X |
| 4,450,060 | 5/1984 | Gonzalez | 204/129 X |

Primary Examiner—Donald R. Valentine

[57] ABSTRACT

A device for producing and recycling hydrogen (DPRH) from electrolyte and hydrocarbons comprises an electrolysis unit which is energized by the source of direct electro-current and agitated by the generator of ultrasonic vibrations. The electrolysis unit comprises a container having inlet means for introducing a gasoline or other hydrocarbons and for introducing an electrolyte; a pair of positive and negative electrodes connected to the source of direct electro-current; outlet means for exiting hydrogen and oxygen. A DPRH is adapted for producing hydrogen from an electrolyte, gasoline, petroleum or the like, including gaseous hydrocarbons. A DPRH is adapted for producing oxygen from an electrolyte. A DPRH is adapted for recycling hydrogen from exhaust gases and for reducing polluting emission into the atmosphere. A DPRH is adapted for powering a vehicle utilizing an electrolyte and hydrocarbons as sources of energy. A DPRH is adapted to be inserted in the space gas station for producing hydrogen and oxygen.

5 Claims, 1 Drawing Sheet

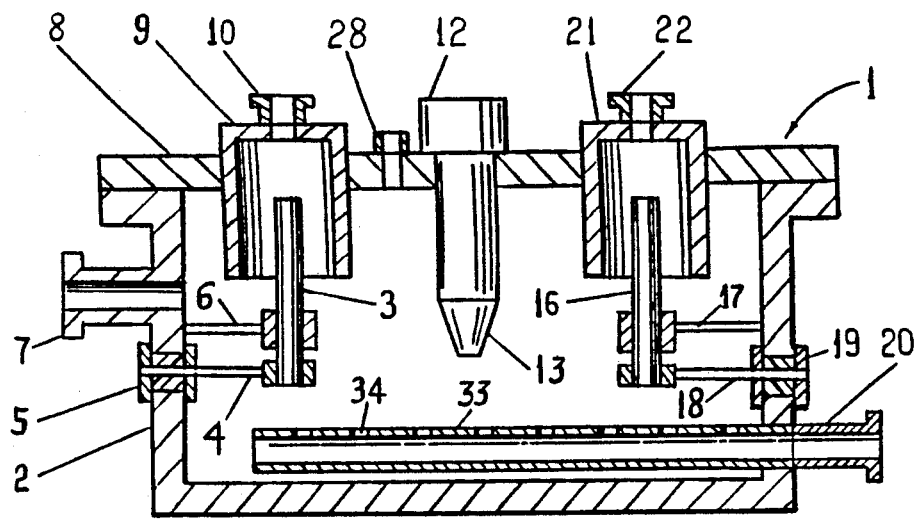
FIG_1_
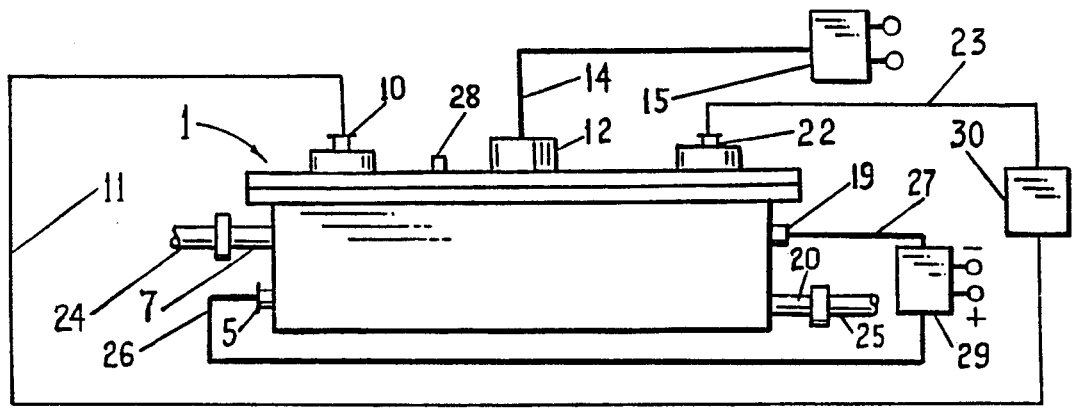
FIG_2_
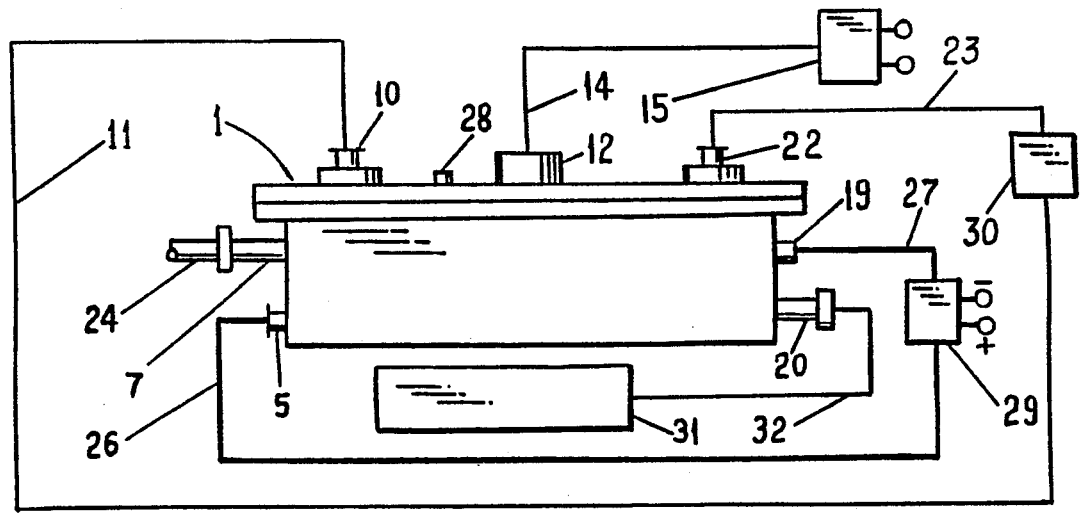
FIG_3_

DEVICE FOR PRODUCING AND RECYCLING HYDROGEN

BACKGROUND OF THE INVENTION

1. Field of the Invention

The present invention relates generally to devices for producing and recycling hydrogen (DPRH). With rapidly rising the uncertainty of a continued supply of fossil fuel, greater interest in alternative energy forms for vehicles and engines in general has been perceived.

Moreover, civilization's awareness of a pollution free environment is at an all time high.

2. Prior Art

A hydrogen is not available in nature, it must be produced by expending large amount of others energy sources. Attempts has been made in the past to provide a device which employs an electrolysis unit for producing oxygen and hydrogen gases in the amount required to run an engine which are described, for example, in U.S. Pat. Nos. 2,373,032; 4,344,831; 4,450,060. These devices are not widely utilized for powering vehicles because of low efficiency.

Accordingly, this invention has as main object to provide a device for producing combustible gases from both an electrolyte and gasoline or the like including gaseous hydrocarbons.

Another object is to have the device of such construction as to be readily adaptable for insertion or connection among the parts of a conventional internal combustion engine or the gas turbine for powering a vehicle or the like.

A further object of this invention is to provide the device of such construction as to be adaptable for insertion in space gas station for producing combustible gases for space exploration.

It is yet another object to provide a device which substantially decreases pollution levels than those which have been experienced heretofore. It is another object of this invention to provide the device for recycling hydrogen from exhaust gases for reducing polluting emissions into the atmosphere.

In keeping with these objects and with others which will become apparent hereinafter, a DPRH comprises a container having inlet means for introducing a gasoline or the gaseous hydrocarbons and an electrolyte respectively into said container, a source of direct electro-current, a pair of positive and negative electrodes connected to source of direct electro-current and means to agitate both said electrolyte and hydrocarbons to increase the speed of decomposition of electrolyte and hydrocarbons.

The novel features of the present invention are set in particular in the appended claims. The invention itself, however, both as to its construction and its manner of the operation will be best understood from the following description of the preferred embodiments which are accompanied by the following drawings illustrating the invention.

BRIEF DESCRIPTION OF THE DRAWINGS

FIG. 1 is a cross section of the container of DPRH;

FIG. 2 is a scheme of the system for producing hydrogen from an electrolyte and hydrocarbons;

FIG. 3 is a scheme of the system for recycling hydrogen;

DESCRIPTION OF A PREFERRED EMBODIMENT

A DPRH identified as a whole with reference numeral 1 comprises an electrolysis unit having a container 2 adapted for introducing both an electrolyte and hydrocarbons. A container 2 has a cover 8, inlet means 7,20 for introducing an electrolyte and hydrocarbons respectively. An inlet 20 and a pipe 33 (FIG. 2) are associated with a container 2 for introducing gasoline, petroleum or the like having compounds of carbon and hydrogen. Piping 25 is employed for introducing gasoline, petroleum or the like into the container 2. The inlet 20, pipes 25,33 also may be employed for introducing gaseous hydrocarbons including natural gas into the container 2 for producing hydrogen both from electrolyte and gaseous hydrocarbons. The inlet 20 also may be employed for introducing exhaust gases having hydrocarbons from exhaust system 31 by means of the pipe 32 to provide reducing polluting emissions into the atmosphere. Piping 24 is employed for introducing an electrolyte into the container 2 by means of inlet 7. The container 2 adapted for introducing said electrolyte and said hydrocarbons to produce hydrogen by decomposition of both electrolyte and hydrocarbons.

The positive and negative electrodes 3,16 are supported by means of the bars 6, 17 respectively having an insulation relative to the container 2. Boxes 5,19 are fixed to the container 2 to provide the hermetic insulation of cables 26,27 connected to source of direct electro-current 29. Cables 26,27 are joined to positive and negative electrodes 3,16 respectively by means of conductors 4,18. Collectors 9,21 are adapted to collect oxygen and hydrogen respectively liberated in result of decomposition both of electrolyte and hydrocarbons.

Collectors 9,21 are fixed, for example, to the cover 8. The pipe 33 is fixed to the inlet 20 and arranged so to introduce hydrocarbons in lower portion of container 2 below electrodes 3,16. Electrodes 3,16 and the pipe 33 are adapted to be immersed within an electrolyte. The pipe 33 has openings 34 for introducing hydrocarbons into an electrolyte. It should be apparent that numerous fluids can be utilized in DPRH as an electrolyte. An electrolyte it is a water and any material that will ionize a water, for example, Acids, Bases, Salts. The preferred electrolyte it is distilled water and Sodium Hydroxide. Various electrodes can be used for the optimal dissociation of the aqueous portion of the electrolyte solution into its elemental components, and FIG. 1 teaches the use of one specific form in which electrodes 3, 16 are formed as hollow pipes to provide reactions from both sides of immersed portion electrodes. Electrodes 3,16 are made of platinum to provide a catalysis of chemical reactions. A DPRH is adapted for producing a hydrogen both from aqueous portion of the electrolyte and hydrocarbons. A decomposition of hydrocarbons is result of reaction between hydrocarbons and a steam in the presence of the catalyst (platinum electrodes). It is known in prior art apparatus that the negative electrode is warming in result of the thermal effect and produces a hydrogen and a steam around the negative electrode. Reactions between hydrocarbons and steam produce a mixture of hydrogen and carbon monoxide. Again, as in the Bosch process, the reducing property of the carbon monoxide gas may be used to produce more hydrogen gas in a reaction with an additional steam. Decomposition of hydrocarbons is result of combined action of the electrolysis, thermal action and chemical reactions.

A further development to increase an efficiency of DPRH comprises introducing ultrasonic or sonic vibrations into the container 2, in order to agitate an electrolyte/hydrocarbon mixture and to increase the speed of decomposition of both an electrolyte and hydrocarbons. The vibrations may be introduced by piezoceramic or magnetostrictive generator 12 mounted to the cover 8. The vibrator 13 adapted to be immersed into mixture of an electrolyte and hydrocarbons. The generator of ultrasonic or sonic vibrations 12 is connected to the source of electro-current 15 by means of cable 14.

The container 2 comprises outlet means 22 and 10 associated with the collectors 21,9 for exiting a hydrogen and oxygen liberating at the negative electrode 16 and positive electrode 3 respectively. Outlet means 22,10 are connected with outlet piping 23, 11 respectively to supply the hydrogen and the oxygen to the fuel system 30, for example, of the automobile. Pumps or other conventional arrangement to pump the hydrogen and oxygen are not shown. Piping 23,11 adapted to be connected to the storage tanks.

The electrodes 16,3 are connected to the source of direct electro-current 29 by means of cables 27,26 respectively. The source of direct electro-current 29 is adapted to provide the low voltage electro-current in the electrolyte/hydrocarbons mixture to decompose both the electrolyte and hydrocarbons.

The outlet 28 adapted for the check valve. The check valve is not shown. The present invention adapted to supply the combustible gases in the amount required to run an engine or gas turbine for powering a vehicle or the like.

Present invention adapted for insertion in space gas station for producing combustible gases for space exploration. A DPRH for use in space gas station must provide a circulation of the electrolyte and a separation of liberated gases from electrodes 3,16.

Present invention may be adapted to provide combustible gases for submarine power plant.

Present invention adapted to reduce polluting emissions of motor vehicles into the atmosphere.

Motor vehicles are the major sources of carbon monoxide and hydrocarbons. "In the United States gasoline and diesel vehicles produced about 70 percent of the carbon monoxide, 50 percent of the hydrocarbons, 35 percent of the nitrogen oxides". /Laurent Hodges, "Environmental Pollution"/.

It is necessary to join, for example, the exhaust system of the automobile 31 with the inlet 20 of the DPRH 1 by means of the pipe 32 to provide reactions between hydrocarbons and steam near the electrode 16 in the presence of catalysts and to produce a mixture of hydrogen and carbon monoxide. Carbon monoxide will be used to produce more hydrogen gas in a reaction with additional steam. Pipes 11 and 23 also may be connected with the fuel system 30 of the automobile.

The above operations are summarized as follow:

DPRH is operated for producing the combustible gases in result of decomposition of aqueous portion of the electrolyte and gasolyne, petroleum or the like;

DPRH is operated for producing the combustible gases in result of decomposition of aqueous portion of the electrolyte and gaseous hydrocarbons;

DPRH is operated for producing the combustible gases in result of decomposition of aqueous portion of the electrolyte, gasolyne or the like and gaseous hydrocarbons;

DPRH is operated for recycling hydrogen from exhaust gases;

DPRH is operated for cleaning exhaust gases of any exhaust systems to provide reducing polluting emissions into the atmosphere.

Moreover, having thus described the invention, it should be apparent that numerous structural modifications are contemplated as being part of this invention as set forth hereandabove and as defined hereandbelow by the claims.

What is claimed is:

1. A device for producing and recycling hydrogen (DPRH) comprising a container having inlet means associated with said container for introducing a gasoline and an electrolyte respectively into said container, a source of direct electro-current, a pair of positive and negative electrodes connected to said source of direct electro-current; said container adapted to receive said electrolyte and gasoline, said electrodes adapted to be immersed within said electrolyte, said inlet means for introducing a gasoline comprising a pipe located inside of said container, said pipe arranged in lower portion of said container so to introduce said gasoline below said electrodes; said container comprising outlet means associated with said container for exiting said hydrogen gas liberating at the negative electrode and oxygen liberating at the positive electrode; said DPRH adapted for producing said hydrogen by decomposition of both said electrolyte and gasoline.

2. A device for producing and recycling hydrogen (DPRH) comprising a container having inlet means associated with said container for introducing a gasoline and an electrolyte respectively into said container, a source of direct electro-current, a pair of positive and negative electrodes connected to said source of direct electro-current; said container adapted to receive said electrolyte and gasoline, said electrodes adapted to be immersed within said electrolyte, said inlet means for introducing a gasoline comprising a pipe located inside of said container, said pipe arranged in lower portion of said container so to introduce said gasoline below said electrodes; said container comprising outlet means associated with said container for exiting said hydrogen gas liberating at the negative electrode and oxygen liberating at the positive electrode; said container comprising a generator of ultrasonic vibrations having a vibrator, said vibrator is located inside of the electrolyte/gasoline mixture to agitate both said electrolyte and gasoline and to increase the speed of decomposition of said electrolyte and gasoline; said DPRH adapted for producing said hydrogen by decomposition of both said electrolyte and gasoline.

3. A device for producing and recycling hydrogen (DPRH) as defined in claim 2, wherein said outlet means associated with said container for exiting hydrogen gas and oxygen respectively comprising piping for connecting said container with a combustion chamber, for example, of gas turbine.

4. A device for producing and recycling hydrogen (DPRH) as defined in claim 2, wherein said positive and negative electrodes are made of platinum and formed as hollow pipes.

5. A device for producing and recycling hydrogen (DPRH) comprising a container having inlet means associated with said container for introducing gaseous hydrocarbons and an electrolyte respectively into said container, a source of direct electro-current, a pair of positive and negative electrodes connected to said source of direct electro-current; said container adapted to receive said electrolyte and gaseous hydrocarbons, said electrodes adapted to be immersed within said electrolyte, said inlet means for introducing the gaseous hydrocarbons comprising a pipe located inside of said container, said pipe arranged in lower portion of said container so to introduce said gaseous hydrocarbons below said electrodes, said pipe adapted for introducing exhaust gases having gaseous hydrocarbons; said container comprising outlet means associated with said container for exiting said hydrogen gas liberating at the negative electrode and oxygen liberating at the positive electrode; said container comprising a generator of ultrasonic vibrations having a vibrator, said vibrator is located inside of the electrolyte/hydrocarbons mixture to agitate both said electrolyte and hydrocarbons and to increase the speed of decomposition of said electrolyte and hydrocarbons; said DPRH adapted for producing said hydrogen by decomposition of both said electrolyte and hydrocarbons.

* * * * *